Patented Oct. 3, 1939

2,174,535

UNITED STATES PATENT OFFICE 2,174,535

UREA-FORMALDEHYDE REACTION PRODUCT

Leonard Smidth, Philadelphia, Pa.

No Drawing. Application March 27, 1936, Serial No. 71,181

13 Claims. (Cl. 260—69)

This invention relates to the preparation of translucent or non-transparent condensation products of ureas and aldehydes, particularly formaldehyde.

At the present time there are no urea-formaldehyde resins in cast form being made commercially. The cast resins which have been hitherto prepared have been unstable and have cracked or disintegrated after a few weeks in some cases and after several months or even years in others. Urea-formaldehyde molding compositions containing a cellulose filler which reduces the tendency to crack are being manufactured in considerable quantities but compared to the more extensively used phenol formaldehyde molding compositions they have three important disadvantages as is recognized by Norton (page 647 in "Unit Processes in Organic Synthesis" compiled by Groggins) as follows:

"The colloidal nature of the reaction products of urea and formaldehyde explains the chief difficulties that are encountered in the commercial products of this type. First is the instability at room temperature of the compounds before molding, it being very difficult to prevent the reaction from progressing slowly even at low temperatures, whereas phenolic compounds are quite stable. Second, even after taking from the mold, there is a tendency to continue to react, setting up internal stresses and strains. The molding cycle is necessarily critical on this account, as too long a heating, even by a few seconds, sets up secondary reactions that cause blistering. * * * Third, the chemical and water resistance of the molded articles is comparatively poor."

The present invention discloses a method of preparing cast resins which products are stable and do not crack. When applied to present day molding compositions it overcomes in a large measure these inherent disadvantages.

The principal object of the present invention is to prepare improved urea-formaldehyde reaction masses which are polymerized without being hydrated. A further object is to prepare a casting resin which when poured into molds and hardened will give a relatively elastic product, having relatively great tensile strength and which is capable of being readily worked, machined and fabricated into various articles employed in commerce, in the arts and in industry. Another object is to prepare a hot molding composition, which easily and readily flows during the hot molding operation and quickly cures to a final hardened material.

Another object is to provide a simple method of exactly determining when the reaction has advanced to a state of complete condensation without polymerization accompanying the same.

Other objects and advantages of the invention will become apparent from the following description.

Broadly considered, the present invention involves reacting formaldehyde and urea in the molar proportions of about 2 of the former to 1.1–1.33 of the latter under regulated conditions of acidity, temperature and time capable of regulation to limit the extent of reaction, and when the reaction has proceeded only to the point where appreciably all of the water of condensation is liberated then removing the water present under conditions of a low acidity, temperature and time product which do not advance the reaction to any substantial degree into the polymerization stage wherein plasticity and flowing qualities are lost. When the water is removed, a viscous casting liquid is obtained which forms a ball when a sample is placed in cold water, this liquid being a colloidal mass which has not yet reached the hydrophobe stage.

A very important aspect of the present invention constituting a more limited embodiment thereof comprises the method by which the reaction is controlled to obtain exactly the correct degree of reaction in the various stages. Prior to the discoveries of the present applicant, no one has disclosed any method of regulating the initial reaction and condensation just to a point where substantially all of the water of condensation is liberated and before polymerization occurs evaporating off the water present. In accordance with this feature of the present invention, the extent of reaction is determined by viscosity readings. When the initial reaction solution is boiled under reflux condensation, the viscosity is tested by a very simple method from time to time by taking up a sample in a standard glass tube and observing the time of emptying. The tube conveniently employed possesses a capacity of 100 cc. and requires 10 seconds to empty water at 25° C. When a slight and gradual increase in viscosity is noted, as is indicated by an increase in the time of emptying of a few seconds, the condensation reaction is complete and all water is in a free state and capable of removal provided the reaction is prevented from proceeding to a point where the molecules polymerize and occlude the water. In order to prevent this polymerization and occlusion of water, the acidity and/or the temperature is lowered to retard the reaction while the water is being removed.

In order to make clearer the distinctions of the present invention over the usual prior art processes, the following should be considered. Since urea resins in general as heretofore produced have a poor resistance to moisture and particularly to boiling water, prior workers have carried out the reaction as far as possible in order to overcome these defects, and in so doing have boiled the solution and increased its viscosity to as great an extent as possible without causing gelatinization. These workers in their attempts to obtain maximum water resistance, have not observed the effect of the viscosity change upon the aging qualities of the product, that is, the property of remaining unchanged and free from cracks over extended periods of time. Since cracking may be caused by improper regulation of many factors, the effect of this viscosity increase was never noticed, particularly because of improper proportions of formaldehyde and urea, which proportions seemed proper because of the ease with which a glass-clear product and a readily flowing molding composition could be obtained. An increase in the proportion of urea to over one mole to two of formaldehyde appeared to make an even greater viscosity necessary in order to obtain good products. The viscous solutions produced by this prior procedure are hydrophobic resins, i. e., those which repel water and can be washed without dissolving.

In contrast thereto, the corresponding reaction of the process of the present invention is not carried out to an extent which produces a viscous mass but instead a reaction mass is produced which is increased in viscosity only to a slight degree, depending upon the exact proportions of urea and formaldehyde, the resulting colloid being non-hydrophobic or hydrophilic in character.

For the sake of conciseness and to make the invention more readily understandable, the process of manufacturing urea-formaldehyde condensation products is divided into five necessary stages or operations. Instead, however, of performing these operations in sequence some of them may be carried out simultaneously or overlap one another in the manner hereinafter explained. They are as follows:

(1) *Addition stage.*—When urea and formaldehyde are mixed under neutral or mildly acid conditions initial reaction commences, forming primarily dimethylol urea, and also methylol urea or some other simple addition product, the rate of reaction being accelerated by heating and also depending upon the acidity prevailing.

(2) *Condensation stage.*—This stage occurs when the molecules of the dimethylol urea or other product formed in Stage (1) condense and liberate water. Acidity, temperature and time control the extent of the condensation. This is said to be complete when no more water of reaction can be liberated.

(3) *Polymerization stage.*—During this stage the molecules formed in the condensation stage polymerize or associate to form larger molecules or chains by combining with one another. The addition of acids, the application of heat and the passage of time speed up and determine the extent of the polymerization.

(4) *Removal of water.*—This important step may be accomplished in many ways depending on the form of the product desired and upon other circumstances. While the water is being removed the reaction continues unless the mass is maintained under a low acid, temperature and time product.

(5) *Hardening.*—This step is accomplished by heating the dried mass either with or without pressure in an oven or in molds. The acidity of the mass must be of a proper degree in order that this step be completed within a reasonable time.

*Proportions*

The proportions of formaldehyde to urea suitable for the preparation of the novel products of the present invention are 2 moles of formaldehyde to 1.1–1.33 moles of urea. During completion of the reaction, there must be sufficient urea present to take up all the formaldehyde produced by the reaction which is not removed by evaporation or oxidation, for otherwise the reaction continues while the product is in use and gradually gives off formaldehyde, leading to shrinkage and finally causing cracking to take place. According to my conception, the usual and principal reaction between urea and formaldehyde under neutral or acid conditions regardless of proportions takes place as follows:

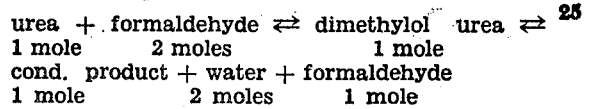

urea + formaldehyde ⇌ dimethylol urea ⇌
1 mole    2 moles                  1 mole
cond. product + water + formaldehyde
1 mole           2 moles        1 mole It will be noticed that the above is an equilibrium reaction. It has been found with respect thereto that the point of equilibrium is determined by the ratio of the urea to the formaldehyde and by the acidity, temperature and time factors. At high acidity the reaction moves to the right. If there is an excess of formaldehyde the point is toward the left; if there is an excess of urea it is toward the right. The use of more than one mole of urea therefore serves to aid the reaction in going to completion to form insoluble products by reacting with the freed formaldehyde which, if left in, later evaporates out of the hardened products causing cracks to form.

If less than one mole of urea is used to 2 moles of formaldehyde and at a pH of 5.5 or more, the reaction will not result in a hard or sufficiently firm material. Because of its soft plastic nature, it is only with difficulty removed from the mold in which the same is cast. Such material will not harden in the mold no matter how long it is left in the oven except on the surface exposed to the heated air, which product is of no value. On the other hand, if the acidity is less than 5.5, the cast material can be hardened and can be more easily removed from the mold, the hardening effect of the acid being dependent upon the proportion of urea. However, if such a product is allowed to stand, it will be found that the surface losses formaldehyde in addition to water, becomes further hardened and shrinks, causing strains to be set up eventually cracking and leading to products of little or no value, which may occur only after many months or longer. This effect is even more marked if the hardened article is cut or broken so that a fresh surface is exposed.

Now, if instead of using less than about one mole of urea to 2 of formaldehyde, I use one or more than one mole, the reaction shifts nearer completion and thus with increasing ratios of urea the continuing reaction to the left is found to be less and less. When a proportion of 1.1 of urea to 2 of formaldehyde (or 1 of urea to 1.8 of formaldehyde) or above is employed, a boiling-water resistant, or hard product, is obtainable at a pH value at about 5.5 in a reasonable time. If a proportion of about 1.3 moles of urea is used, a resistant product can be obtained at as high a pH as 7.0 and such product has still more desirable properties. Thus high acidity will cause the hardening of products with a low urea content, but such products are undesirable because the reaction continues after removal of the cast product from the mold, which products lose formaldehyde and consequently shrink and crack. With a ratio of 1.1–1.33 moles of urea to 2 of formaldehyde, the reaction is sufficiently complete to reduce the continuing action so that it is negligible and the products thus produced will not shrink or crack providing the product is reacted in accordance with the other necessary steps and conditions specified herein. Mixtures having more than 1.33 of urea to 2 of formaldehyde contain urea in excess of that which serves any valuable purpose and if too large an excess is used, it weakens and causes the final product to crack.

Methods of initially reacting

There are two procedures for reacting the urea and the formaldehyde which have proved particularly suitable for the operation of the invention. In the first, the whole amount of the urea is added to the formaldehyde in the beginning and in the second only part of the urea is initially added and reacted after which the remainder is added and reacted.

When the first method is employed certain conditions are necessary where relatively high proportions of urea are employed if products of good quality are to be obtained. When the proportion of urea approaches 1.33 to 2 of formaldehyde, a voluminous white precipitate forms during the reaction unless the pH value is kept at a value above about 6.0. Therefore if large proportions of urea are to be used initially, the pH value is raised to and maintained preferably between 6 and 7 during the early part of the reaction. The presence of a precipitate in large quantities interferes with the reaction, makes the removal of water difficult, apparently because of absorption and acts as a weakening diluent in the final product. Therefore its formation must be avoided if products of value are to be obtained.

The reaction under the above conditions is continued until the addition of a little formic acid does not cause a prohibitive amount of the voluminous white precipitate to form. If the acidity is lowered before initial reaction is completed, the excessive amorphous precipitate will form. If the reacting solution is kept neutral or basic, the initial reaction will require a considerable period of time. When a mixture of 2 moles of formaldehyde to 1.25 moles of urea are reacted at a pH value between 6 and 7, the reaction mass is preferably boiled only for about one hour to complete the initial reaction.

In connection with this initial reaction, it is important to note that the initial pH value raised by the addition of the usual alkali hydroxides falls to lower values during reaction and will form the objectionable precipitate unless the pH value is maintained by the introduction of an additional amount of alkali to a pH value above 6 where the maximum permissible proportion of urea is employed. For example if a slightly basic or neutral solution is initially employed, the pH will drop say to 5.8 after boiling. If the original reaction is carried out in a more basic solution with high urea content, a long boiling is necessary in order to get the initial reaction to go to completion, during which boiling the pH drops to the acid side of neutral and permits completion of the initial reaction. The higher the proportion of urea in the reacting mixture the greater is the time required to complete the initial reaction without forming the large quantity of white precipitate.

This profuse white precipitate should not be confused with a slight clouding of the mass which occurs under normal operation of the present process even when the reacting conditions and procedure are carried out under the most favorable conditions. The clouding occurs during the initial reaction some time after boiling is commenced or under vacuum distillation or removal of water and is apparently due to the formation of some reaction product other than dimethylol urea. The function of this slight cloudiness in the reaction is not understood, but the use of proportions of urea and formaldehyde which do not form the same lead to inferior final products.

When this original action is complete, it is desirable to increase the acidity such that the condensation reaction will be accelerated and completed within a reasonable time. Therefore in my preferred procedure under this embodiment, I add formic acid or other suitable acidity imparting substance to reduce the pH value of 6 to 7 down to 4.2–5. If the initial action is carried out at a pH value below about 5.5, the condensation reaction will be completed in a reasonable time without the addition of acid. The acidity in no case should be increased to a low pH value at which the reaction proceeds so rapidly as to make it impossible to arrest the reaction upon completion of the condensation reaction. Such is necessary in order to prevent polymerization at this period of the reaction and consequent hydration, the importance of which is hereinafter described. Practically considered, the pH should not be lowered to a value below about 4.2.

According to the hereinbefore mentioned procedure for initially reacting the urea and formaldehyde, only part of the urea is reacted with the formaldehyde in the beginning, the remainder being added in small portions, in one large portion or continuously to the reacting mass. With this procedure, the formation of a large white precipitate is easily avoided. The first portion of the urea reacted under this embodiment may be as low as two-thirds of a mole or any amount less than that quantity which forms the objectionable amount of precipitate under the prevailing acidity. Very good results are obtained using initially a little less than one mole of urea to 2 moles of formaldehyde. In no case, however, is the reaction permitted to continue for a period which forms a glass-clear solution from the said reaction mass, for reaction to such extent indicates premature polymerization and occlusion of water in a condition which cannot be removed without destroying the plastic quality of the product obtained. During this second procedure the addition reaction as to part of the components and the condensation as to another part occurs at the same time in the reacting solution.

Control of reaction

As is known to the art, the rate of reaction of urea and formaldehyde is dependent upon the acidity, temperature and time factors. In operating in accordance with the present invention, I control and employ these factors to produce an extent of reaction in the various stages to produce results heretofore never obtained.

During the addition and condensation stages hereinbefore described and except as otherwise indicated, any combination of the acidity, temperature and time factors may be used providing each is correlated with the other to produce the exact state of reaction hereinafter described. Practically speaking, neither the acidity nor the temperature must be so low as to make the time factor unreasonably long. The acidity factor cannot be so great as to destroy the operator's complete control of the extent of the reaction. The temperature of the reaction is preferably that of the boiling aqueous solution because of the ease with which the temperature is maintained constant. As an illustration of the relation of the time and the acidity factors necessary to complete the condensation stage, the following may be considered: When formaldehyde and urea are reacted in the molar proportion of 2 to 1.1 at a constant pH value of 7, the time necessary determined by experiment was around 20 hours, whereas at a pH value of 4, the time was only a few minutes.

*Retarding or arresting the reaction upon completion of the condensation*

In operating in accordance with the present invention, it is absolutely essential that the reaction be arrested or substantially retarded upon completion of the condensation reaction for a period sufficient to permit complete removal of the water of solution and of reaction before polymerization occurs.

If the condensation reaction is not completed before polymerization is commenced, potential water exists in the viscous or hardened mass which upon liberation effected by the heat of the drying or the hardening steps cannot be removed without destroying the plastic qualities of the product. Such products after molding or casting are unstable to boiling water and if cast in the absence of cellulose filler form cracks.

If before the water of solution and of reaction are removed, the reaction is permitted to go beyond the condensation stage into the polymerization stage, as may be indicated by a substantial increase in viscosity, or, in the case of a clear solution, by the formation of a mass which will remain clear upon cooling, the molecules which greatly increase in size during the polymerization in some manner take up or occlude the water and likewise other inferior products are obtained.

Therefore the crux of the present invention lies in the procedure which reacts urea and formaldehyde in the proper proportions herein specified exactly to the point where condensation and liberation of water is complete and then arrests the reaction and evaporates off the water under conditions which do not cause appreciable polymerization before hardening. The determination of the desirability of carrying out the process in this manner involved much difficulty because of the many variable factors. Furthermore, the regulation of the reaction in this manner was not simple for up to the time of the invention no one had disclosed a method or means of determining exactly when the condensation reaction was just completed.

In accordance with the present invention, I have discovered that viscosity readings constitute an accurate method of determining the extent of reaction when the reaction is carried out at a constant temperature without evaporating off the water present, as at boiling under reflux condensation. Any means of determining the viscosity may be employed, but I prefer to use a glass pipette of 10 cc. capacity requiring 10 seconds to empty or deliver water at 25° C. The viscosity of the reacting solution during initial reaction and up to a short period before the condensation reaction is complete is near that of water and requires around 9.8 seconds to flow from the pipette. The viscosity readings are taken near the boiling temperature, suitably after the solution has sufficiently cooled to permit a sample to be removed.

When the viscosity increases to an extent indicated by an increase in time of emptying of only a few seconds, the condensation reaction is complete. The number of seconds increase necessary to reach this point varies in accordance with conditions existing but particularly the proportion of urea present. With 1.1 molar proportions to 2 of formaldehyde, the condensation is complete when the reading is about 11 seconds and with 1.25 moles of urea, the time is about 12.5 seconds.

When the viscosity reaches this point, the reaction must be arrested or retarded immediately in order to avoid polymerization in the presence of the water and the consequent hydration. To arrest the reaction at the proper point, the temperature may be immediately lowered or the acidity may be decreased by the addition of an alkaline hydroxide or other substance increasing the hydroxyl ion concentration. Both methods are preferably employed where the reaction has been carried out at low pH values, for example, below pH 5. At higher pH values it is usually sufficient to lower the temperature very quickly as by the use of vacuum distillation applied to the surface of the material by which procedure the temperature may be lowered from about 100° C. to 35° C. in a short period.

At a high acidity such as at a pH of 4.0, the reaction must be stopped at once by the addition of an alkali, for otherwise the viscosity rises rapidly and hydration will quickly occur. At a pH of about 5.5 the condensation proceeds at a slow pace, requiring a long time for completion, with the good result however that there is negligible hydration even if the vacuum distillation or removal of water is effected without raising the pH value. It should be noted here that some of the formic acid which is normally present distills off during the drying, and so unless a buffer is used, the pH spontaneously rises and checks the tendency to hydration. However, a pH of 5.5 is generally too high from a practical point of view to conduct the condensation as it requires too long a time. I prefer to use a pH ranging down to about 4.2 and immediately increase the pH value when the condensation is finished.

If potassium hydroxide or other base is to be added to assist the retarding action, a quantity is added which will increase the pH value to about 5.5 or above, the exact amount depending upon the temperature and time factors existing during removal of the water.

In order to make clearer the exactly proper viscosity increase which must occur, the following should be considered: If the reaction mass having 2 to 1.1 molar ratio of formaldehyde to urea, reacted to initially form a clear solution, is boiled until the reading is about 12.7 seconds instead of 11.0 seconds, the reaction mass remains glass clear when a sample is cooled, thereby showing that the molecules have polymerized and taken on hydrophobic qualities and water of hydration. If the reaction mixture having 2 moles of formaldehyde to 1.25 is boiled until the reading is 25 seconds, the glass clear product likewise is obtained which has much greater hydrophobic qualities.

If the heating and reacting is continued past these points the viscosity increases very rapidly forming a syrupy mass which if dried and cast forms a product which dries out on the surface and shrinks, setting up strains which cause the product to eventually crack. If a molding composition is formed from this syrupy mass, as is common in present day practice, by incorporation of a cellulose filler and drying, the resulting product so produced, I have found, is unstable at room temperature before molding and loses the plasticity necessary for the molding operation. If molded immediately or before loss of plasticity, the products require an unnecessarily long molding period and the hot molded product shrinks upon standing. Therefore it is clear that the limitation upon the amount of increase in viscosity permissible in accordance with the process of the present invention is definite and clear.

While I have used viscosity measurements as a means of determining the end of the condensation reaction and the point at which the water must be removed, the invention is not limited to such means. Measurements of refractive index, surface tension and other equivalent methods may be employed.

*Removal of water*

As hereinbefore indicated, the removal of water must be effected under mild conditions, that is at a low acidity-temperature-time product. Such conditions are low acidity (high pH value), low temperature and rapid removal of the water. The preferred procedure where a cast product is to be produced involves the use of a vacuum which lowers the temperature. It is also preferable to commence the removal of water while the mass possesses a pH value around 5.5 to 6, such that the increase in pH value, apparently due to evaporation of formic acid, will yield a viscous casting liquid possessing the optimum pH value for the production of hardened cast products free of bubbles in the minimum of time. Where drying methods other than vacuum distillation are employed such as simple distillation, air blowing or spray drying, requiring higher temperatures or longer periods of time, the pH value must be correspondingly adjusted or raised, for under no circumstance must polymerization and occlusion of water be permitted before the water is removed, which water includes that formed by the completed condensation reaction and as well that of the formaldehyde solution, if formalin was used.

One of the distinctive features of the present invention is the amount of drying of the completely condensed reaction mass permissible without causing setting of the mass. Under the usual methods heretofore described in the literature, the drying operation if continued in an attempt to remove all the water causes gelatinization of the mass and occlusion of the remaining water, and a casting liquid of course is not obtained. This gelatinized product if hardened, eventually loses part of the water causing shrinkage and cracking.

Prior workers have stated that they remove as much water as possible but they mean of course, under the conditions of their operation, such as the extent of hydration, the acidity, the vacuum, time required for distillation, etc. But unless the operations and conditions are regulated and correlated within the limits disclosed in this application, it is impossible to remove sufficient water to obtain a castable product which will not crack. For example, a hydrated product will unavoidably gelatinize before all water is removed.

The process of the present invention includes the novel step of drying the liquid condensation product until a sample of the same will form a ball in water at a temperature of 10–15° C., which does not readily lose its shape at this temperature. When the ball is obtainable from the completely condensed product, the drying operation is complete, and a translucent or non-transparent casting liquid is obtained which is substantially free of both potential water of condensation and of all free water.

*Casting*

The liquid mass, free of water, is quite viscous in nature and therefore must be poured with care so as not to introduce bubbles. For this reason, the pH value of the liquid should not be below about 5.5, for at lower values, the solidification occurs in such a short period that the bubbles do not have sufficient time to rise to the surface. The period before solidification takes place is dependent therefore upon the acidity of the mass. Consequently it can be controlled at will by adjustment of the pH values, or by the addition of acid or alkaline substances.

A pH of 6.5 is preferable in the casting solution or in the molding composition. For hardening the casting materials, a low pH such as 5.5 results in solidification in so short a time that the bubbles present generally do not have a chance to rise to the surface; at a pH above 6.5 the time of hardening is unnecessarily lengthened to an extent depending upon the amount above 6.5. Apparently at high pH values the full strength of the material is never attained even though castings are left in the oven indefinitely. Molding compositions having a pH much below 6.5 tend to lose their plasticity on standing, whereas, a value above this amount does not allow the composition to cure properly. The present invention, however, is not limited to any particular acidity in the casting and molding composition.

The presence of plasticizing, softening or other such materials generally retards the time of solidification and at the same time prolongs the hardening period. These added plasticizing or softening agents reduce the tendency of the hardened material to shrink and since the urea condensation products have a relatively high water absorption and tend to crack because of the absorption, it is best to have a plasticizer which is repellant to or insoluble in water. Example, benzyl alcohol or castor oil.

A true white, porcelain material which does not discolor with age and is machinable and workable without being brittle, is much in demand in the industries and cannot be prepared from the widely used phenol formaldehyde condensation products because of the discoloration. Such product can be obtained from material prepared from the foregoing invention by incorporating pigments, such as lithopone or titanium dioxide or mixtures thereof into the liquid mass at any point before solidification occurs.

In adjusting the pH value at this stage, it must be borne in mind that the period necessary for hardening is also dependent upon the acidity, the higher the pH the greater the time.

I have found that lead molds give very satisfactory castings of various shapes and prefer to use the same because they may be easily prepared from steel models or in other inexpensive ways; the metal itself being cheap and the molds themselves being remeltable and thus reusable. However, other molds can be employed such as those from glass, rubber, metal, paper or other suitable material.

The viscous liquid after being poured in the lead molds which have been preferably warmed are placed in an oven to harden.

Hardening of the cast products

The hardening of the cast products is preferably accomplished by heating to 60–80° C. in the oven. The filled molds are then left in the oven for a period usually ranging from 2 to 8 days, the exact time required being dependent upon the acidity, the presence of a plasticizer, if any, and upon other minor factors.

Production of molding compositions

In preparing molding compositions in accordance with the present invention exactly the same proportions of urea and formaldehyde, the same procedures and the same conditions used in the preparation of the casting liquid are applicable except that a filler which may be alpha-cellulose, wood flour or other cellulosic compound is added at any suitable stage in the process. For practical reasons, it is customary to introduce the filler to the liquid reaction mass immediately after the completely condensed product has been treated to arrest the reaction and before the water is driven off. This very fluid mass mixes easily with the filler to form a homogeneous mass. In my preferred procedure, the cellulose filler in powdered form is introduced into the viscous mass after removal of the water.

The drying of the filler-containing mass from which the water has not been removed may be very effectively accomplished by spreading the mass upon a Monel metal screen and directing a current of warm air through the screen and layer of material. To obtain products of the highest quality, the drying operation must be carried out under a low acidity-temperature-time product as is required in the production of the casting liquid. Inferior products are obtained if the conditions are not regulated to prevent advancement of the reaction and the consequent occlusion of water during the drying.

Because of the unique properties of the urea-formaldehyde casting liquid produced as herein described, such liquid may be used with excellent results in combination with phenol formaldehyde resins. The molded products resulting from casting or molding of the mixture possess more than the expected water resistance, and other improved properties. Therefore, in accordance with a limited embodiment of the present invention, the cloudy, non-hydrophobe condensation product of urea and formaldehyde is mixed in any desired proportion with a resinous plastic reaction product of phenol and formaldehyde. The proportion of the resins employed depends upon the properties desired in the final product and upon economical considerations.

One of the advantages of the present invention with respect to molding compositions lies in the fact that as high as 50% of a powdered cellulose filler can be incorporated without difficulty and a molding powder of excellent quality obtained. Another advantage of the present compositions is that they do not require gasing of the mold, for the quantity of gases given up during such operation is comparatively small.

Example 1

Five thousand two hundred and eighty-one grams of urea were dissolved in 10,562 cc. of 40% (U. S. P.) formalin and 20 cc. of a 10% solution of KOH was added, bringing the pH value up to 6.8. This solution was then heated to boiling under reflux condensation. Prior to the commencement of boiling, the heat was removed in order to reduce the violence of the reaction. When the solution initially reached 65° C., the pH value began to drop, whereupon an additional quantity of KOH was added to maintain the pH value between 6 and 7. A few minutes after the boiling had commenced and 20 cc. of KOH in all had been added (in addition to the 20 cc. originally added to the starting solution) the pH value was 6.3 and remained practically constant at this value for one hour after the start of the boiling. The solution commenced to become cloudy 25 minutes after the boiling began. Heat was again applied when spontaneous reaction had ceased. After the one hour of refluxing, 17 cc. of a 10% solution of formic acid were added, resulting in a pH value of 4.7. The viscosity of the solution from time to time was determined by means of the standard 10 cc. pipette hereinbefore described. Thirty-five minutes after the pH was lowered, the viscosity had increased from 9.8 seconds to 12.5 seconds. When this point was reached, the pH value was brought to 5.6 by the addition of KOH after which vacuum distillation was quickly begun. After the temperature had dropped to about 35° C. a mixture of 120 grams of lithopone and 40 grams titanox were stirred into the liquid mass. The vacuum distillation was then continued until a sample of the solution gave a firm ball in water at 10–15° C. This test indicated that the removal of water was completed. The very viscous solution obtained having a pH of 6.4 was poured into lead molds which were placed in and left in an oven at about 65° C. for several days. The resulting product was a white porcelain-like, almost opaque product.

Example 2

Nine hundred grams of urea were dissolved in 1,800 cc. of ordinary commercial formalin solution and sufficient KOH or other alkaline material was added to raise the pH value to about 5.6. The resulting mixture was then reacted by boiling under reflux condensation for a period of about 3 hours during which time the pH value dropped to about 5. When the viscosity had increased to a point indicated by a period of 12.5 seconds in the standard pipette, the application of heat was discontinued and the mass subjected to vacuum distillation, thereby causing the temperature to drop very rapidly to about 35° C. and arresting the reaction. During this distillation, the pH value of the mass was raised to about 5.5 due primarily to the evaporation of formic acid. When a sample of the solution being dried gave a well defined ball in cold water, the vacuum distillation was discontinued. The resulting cloudy viscous, non-hydrophobe mass was excellently adapted for the production of cast products particularly where the elimination of bubbles is not a problem and for the other purposes herein disclosed.

Example 3

Nine hundred grams of urea were dissolved in 2,400 cc. of 40% formalin whereupon the pH value was brought to 7 by the addition of an alkali metal hydroxide. The resulting mixture was then heated to boiling and refluxed for a period of twenty-five minutes. By the addition of formic acid, the pH value was then brought to 4.7, the boiling and refluxing being continued until the viscosity was 10.3 seconds as measured by the standard pipette. Next, 104 grams of urea were added, which addition brought the pH value to about 7. After ten minutes boiling under reflux, the pH value was reduced to 5 by the addition of formic acid. The boiling was then continued until the viscosity had reached 10.7 seconds. Thereupon 52 grams of urea were added and the boiling was continued until the viscosity reached 11.2 seconds. The resulting solution was made slightly acid (pH 6.0) and evaporated with the aid of a vacuum at a temperature below 50° C. until the mass became very viscous and a sample of the same produced a well formed ball in cold water. The cloudy thick liquid was then cast and hardened as described in Example 1. The vacuum distillation raised the pH to about 6.2. The hardened product was translucent in appearance and could be readily machined.

Example 4

One thousand grams of urea were dissolved in 600 cc. of water containing 3 cc. of a 10% solution of KOH. The resulting solution was warmed slightly and then slowly added to a boiling solution of 1,875 cc. of 40% formalin. The addition was effected in such a manner that a slight excess of formaldehyde was always present and so that the viscosity of the solution was 13 seconds after the addition of the last portion of the urea solution. The pH value was then brought to 6.0 whereupon 200 cc. of castor oil were added. The procedure described in Example 1 was then followed. The castor oil which was at first insoluble dissolved during the vacuum distillation. A measure of the acidity of the casting solution indicated a pH of 6.5. The translucent hardened product possessed excellent water repellant and other desirable properties.

Example 5

The casting liquid produced in accordance with Example 1 without the incorporation of the white pigments having a pH value of about 6.5 and the property of congealing to form a firm ball when dropped into cold water at about 10–15° C. was mixed with 50% of powdered alpha-cellulose with the aid of differential rolls or in a Werner-Pfleiderer mixer having sigma blades. The resulting plastic material was then spread out on Monel metal screens and stiffened by means of the stream of air at room or at a slightly elevated temperature until the material became brittle. It was then ground in the porcelain pebble mill where suitable coloring material and also zinc stearate later to serve as a mold lubricant, were added. After thorough mixing into a homogeneous mass, the material was removed from the mill. The pH value of the material which is excellently adapted as a molding composition should preferably be at about 6.5.

This relatively fine powder may be molded in this form and for the production of some products such form is preferred as, for example, where an extremely smooth surface on the molded product is desired. For most operations, however, a granular material is preferable, particularly for pelleting purposes. This granular material is conveniently prepared by mixing the powder with anhydrous ethyl or methyl alcohol or some other non-aqueous solvent and sheeted on warm differential rolls, suitable for pelleting. The sheets were then broken up into the required granular size. During the sheeting and/or the granulating operation, the volatile alcohol was evaporated off leaving a dry product. This dry product was then molded in a high temperature press at a pressure of about a ton to a ton and a half per square inch at a temperature of 140° C. The composition flowed readily to all parts of the mold and cured very rapidly.

Although the above method is preferable for the preparation of molding compositions primarily because the drying and grinding time requires a minimum of time thereby avoiding the consequent danger of hydration and loss of flow, there may be used alternatively the conventional method employed in the preparation of urea-formaldehyde molding compositions. Where the usual method is employed, the resin solution obtained in accordance with the procedure of Example 1 or of any of the other examples prior to the removal of water by distillation under vacuum is mixed with 35 to 40% of alpha-cellulose in disintegrated or shredded form. The wet mass is then dried as rapidly as possible by blowing heated air through the wet material spread out on Monel metal screens. The dried material is then ground and treated in the same manner as the molding composition above described.

Example 6

A completely condensed reaction product of urea and formaldehyde was produced in accordance with the procedure of any of the foregoing examples and either before or during the vacuum distillation there was added thereto a lesser amount of a plastic condensation product of phenol and formaldehyde. The dried mixture constituted a casting liquid which after hardening possessed excellent water resistance and other improved properties.

The phenol-formaldehyde resin was obtained by reacting 200 grams of phenol with 200 cc. of 40% formalin in alkaline solution until the mass separated into two layers. The aqueous layer was drawn off and discarded after which the pH of the resinous layer was brought to a value of about 6. The resulting resin mass mixes easily with the non-hydrophobe urea-formaldehyde casting liquid produced in accordance with the present invention.

Although specific proportions of materials have been disclosed in the examples herein set out, it should be understood that the invention is not in any sense limited thereto. Inasmuch as the formic acid employed in the instant process serves only to acidify the mass or increase the hydrogen ion concentration, all acids, acid salts and acid compounds which do not interfere with the reaction or destroy the good qualities of the products produced are within the scope of the invention. Latent catalysts may be employed to increase the acidity during casting or molding, but such are not necessary if proper acidities are maintained. Likewise, the invention includes the use of any basic material for neutralization purposes providing the change in pH value of the reacting mass is taken into account. Fillers, dyes and dyestuffs, plasticizers, softening agents and resins of any kind may be added to the liquid mass before casting or to the molding composition, or to any intermediate mass for altering or improving its properties.

The resinous material prepared according to this invention may be used with good results in paints, varnishes and lacquers providing suitable solvents are employed. Since the resinous product is free of water of hydration, its properties are considerably different from those heretofore prepared. That prepared in accordance with the present invention is insoluble in methyl or ethyl alcohol but is soluble in Cellosolve. A Cellosolve solution can very satisfactorily be used as a component of coating compositions of various natures. The resulting coatings have greater film strength and show less tendency to crack than those prepared from hydrated materials or those prepared through the use of a lower proportion of urea than used in the practice of the present invention.

Instead of urea, thiourea or substitution products of urea or of thiourea may be used insofar as they are not specifically excluded by their peculiar properties, all of which substances, I wish to be included along with urea in the designation "urea" used in the following claims. The formaldehyde, unless otherwise specified, may be used either in the commercial aqueous solution or in the gaseous state, or in the form of a solution of anhydrous formaldehyde, or in the form of its polymers. Various changes obviously may be made in the details disclosed in the foregoing specifications without departing from the invention.

I claim:

1. The process of producing urea-formaldehyde condensation products suitable for casting and molding purposes which comprises mixing formaldehyde and urea in a molar ratio of 2 to 1.1–1.33, reacting the mixture under conditions of a pH value above about 5 which form a cloudy solution, continuing the reaction until the viscosity of the reacting solution has increased to an extent indicated by an increase in the time of flow of a few seconds from the standard pipette described herein, which period in any case is insufficient to form a clear solution having hydrophobic properties, then evaporating off the water present under acidity, temperature and time conditions which do not appreciably advance the reaction, until a sample of the same will form a ball in cold water, whereby a stable, substantially neutral, water-free viscous mass is obtained suitable for casting purposes and for use as a component of molding compositions.

2. The process of producing urea-formaldehyde condensation products suitable for casting and molding purposes which comprises mixing formaldehyde and urea in a molar ratio of 2 to 1.1–1.33, reacting the mixture under conditions which form a cloudy solution and do not form an amount of white precipitate imparting weakness and other objectionable qualities to the final product, continuing the reaction to an extent no less than the point at which an incipient rapid increase in viscosity of the solution occurs, and before any appreciable viscosity increase occurs and before a hydrophobe colloidal solution is obtained evaporating off the water present under conditions which do not materially advance the reaction.

3. The process of producing urea-formaldehyde condensation products suitable for casting and molding purposes which comprises mixing formaldehyde and urea in a molar ratio of 2 to 1.1–1.33, initially reacting at a pH value of between 5 and 7 and by boiling under reflux condensation, next condensing until substantially all water of reaction is liberated without causing a substantial rise in viscosity, said extent of reaction being prior to that point required for the formation of a clear transparent product, and then immediately arresting the reaction and evaporating off the water before a hydrophobe resin is formed.

4. In the production of urea-formaldehyde condensation products from mixtures of 1.1–1.33 moles of the former to 2 moles of the latter, the steps which comprise initially reacting the said components, condensing the cloudy solution formed until the liberation of water of condensation is substantially complete and before any rapid increase in viscosity occurs, evaporating off the water from the cloudy solution without advancing the reaction to the hydrophobe stage, until a sample of the mass will form a ball in cold water.

5. In the production of plastic urea-formaldehyde reaction products suitable for casting and molding purposes, the steps comprising reacting formaldehyde and urea in aqueous solution in the molar proportions of 2 to 1.1–1.33 only to a point at which substantially all water of reaction is liberated, which point is reached just before a rapid increase in viscosity of the reaction solution occurs, said point of reaction being prior to that point required for the formation of a clear transparent product, and removing the water of reaction and of solution without substantially advancing the polymerization.

6. In the production of plastic urea-formaldehyde reaction products suitable for casting and molding purposes, the steps comprising reacting formaldehyde and urea in aqueous solution in the molar proportions of 2 to 1.1–1.33 at a pH of from 5 to about 7 under conditions which cause a cloudy mass to form, advancing the reaction to complete the condensation stage and liberation of water, arresting the reaction at this point before polymerization occurs as may be indicated by an initial increase in viscosity, then drawing off the water under mild conditions of acidity, temperature and time which do not advance the reaction and destroy the plastic qualities of the product produced.

7. The process of producing plastic urea-formaldehyde reaction products suitable for casting and molding purposes which comprises initially reacting formaldehyde solution and urea in a molar proportion of about 2 to 1.1–1.3 at an initial pH value of about 6 to 8 by boiling under reflux condensation until acid can be added without causing a voluminous white precipitate to be formed, adding an acidity increasing substance to speed up the reaction, continuing the boiling operation until an initial increase in viscosity is noted; and before a rapid increase in viscosity occurs, lowering the temperature-acidity factor, and evaporating off all the water present.

8. In the production of urea-formaldehyde condensation products from mixtures of 1.1–1.33 moles of the former to 2 moles of the latter, the steps which comprise initially reacting the said components under mild acidic conditions to prevent the formation of a voluminous amorphous precipitate, increasing the acidity to speed up the reaction and continuing the reaction only until an initial increase in viscosity occurs, then drawing off the water under mild conditions of temperature and acidity until a sample of the material forms a ball in cold water.

9. In the production of urea-formaldehyde condensation products suitable for molding purposes from mixtures of 1.1–1.33 moles of the former to 2 moles of the latter, the steps which comprise reacting the said components until substantially all of the water of condensation is liberated, then before polymerization occurs as may be indicated by a rapid increase in viscosity without a specific gravity increase, adding a filler and evaporating off the water present at a low acidity-time-temperature product such that flowing qualities in the hot mold are not lost, the final dried product having a pH value above 5.5, the extent of reaction, before the removal of water is commenced, not having reached the point required to form a clear transparent product.

10. In the production of urea-formaldehyde condensation products from mixtures of 1.1–1.33 moles of the former to 2 moles of the latter, the steps which comprise reacting the said components until substantially all of the water of condensation is liberated, and before polymerization occurs as may be indicated prior to evaporating off the water by a rapid increase in viscosity, then evaporating off the water under mild conditions which do not materially advance the reaction until a sample of the same forms a ball in cold water, pouring the viscous liquid obtained in suitable molds, hardening the cast masses in a heated chamber, and removing the cast products from the molds after hardening, the extent of reaction, before the removal of water is commenced, not having reached the point required to form a clear transparent product.

11. The process of producing urea-formaldehyde condensation products suitable for casting and molding comprising initially reacting formaldehyde and urea in a molar ratio of 2 to 1.1–1.33 at a pH value of from about 6 to 7 for a period sufficient to permit the lowering of the pH to a value between about 4 and 5 without forming a voluminous white precipitate, then adding an acid material to speed up the reaction, boiling the mass in a reflux condenser without advancing the reaction to a point where a clear transparent product is obtained and until a slight viscosity increase is noted, adding an alkaline material to retard further action, evaporating off the water under mild conditions until a sample will form a firm ball in cold water.

12. In the production of urea-formaldehyde condensation products from mixtures of 1.1–1.33 moles of the former to 2 moles of the latter, the steps which comprise reacting to an extent which forms substantially all of the water of reaction without causing a substantial rise in viscosity, said extent of reaction being prior to the point required for the formation of a clear transparent product, and removing all the water from the initial condensation product thus obtained under vacuo before polymerization takes place and a hydrophobe colloid is formed.

13. A reaction product of formaldehyde and urea obtained by reaction of formaldehyde in aqueous solution with urea in the molar proportion of 2 to 1.1–1.33 to an extent no less than the point at which an incipient rapid increase in viscosity of the solution occurs, but before there is a substantial rise in viscosity, such point being prior to the extent of reaction required for the formation of a clear transparent product, then drying by removing water from the solution under conditions which do not substantially advance the reaction, such solution when substantially dry being capable of forming a viscous mass changing to a well formed ball when a sample is put in water at a temperature of 10–15° C.

LEONARD SMIDTH.